Figure 1:
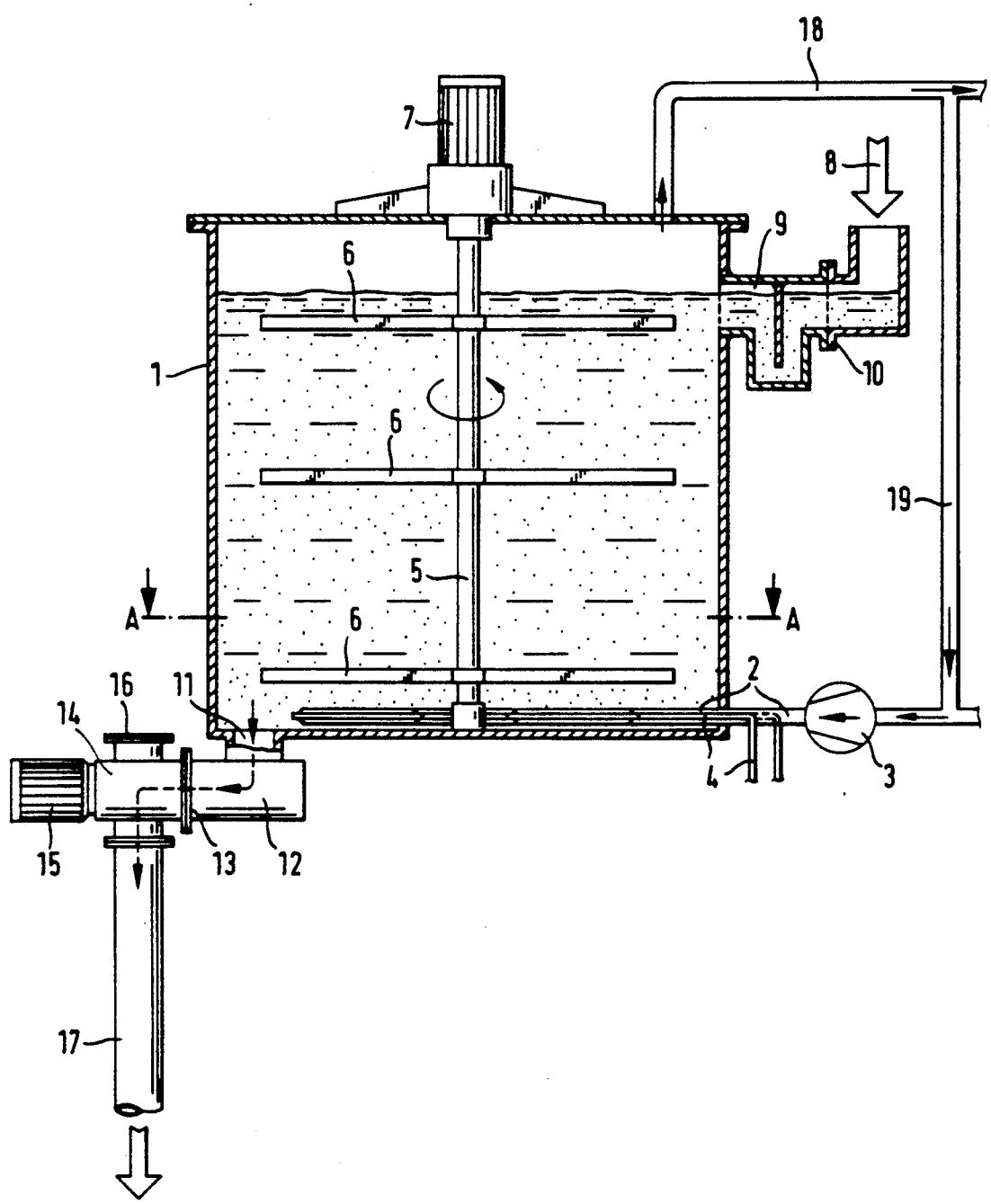

United States Patent [19]

Stenroos et al.

[11] Patent Number: 5,034,131

[45] Date of Patent: Jul. 23, 1991

[54] METHOD FOR TREATING WASTE MATERIAL

[75] Inventors: Arto I. Stenroos, Espoo; Isabel A. Pipping, Helsinki, both of Finland

[73] Assignee: Outokumpu Oy, Helsinki, Finland

[21] Appl. No.: 441,877

[22] Filed: Nov. 27, 1989

[30] Foreign Application Priority Data

Nov. 29, 1988 [FI] Finland .................................. 885526

[51] Int. Cl.⁵ ............................................... C02F 3/02
[52] U.S. Cl. .................... 210/612; 210/621; 210/766
[58] Field of Search .............. 210/612, 613, 177, 178, 210/621, 759, 766, 774, 194

[56] References Cited

U.S. PATENT DOCUMENTS

| | | | |
|---|---|---|---|
| 3,892,660 | 7/1975 | Romell | 210/612 |
| 4,000,064 | 12/1976 | Romell et al. | 210/613 |
| 4,274,838 | 6/1981 | Dale et al. | 210/612 |
| 4,401,441 | 8/1983 | Chase | 210/613 |

Primary Examiner—Tom Wyse
Attorney, Agent, or Firm—Dellett, Smith-Hill and Bedell

[57] ABSTRACT

The invention relates to a method and apparatus for treating waste material mass in a reactor comprising gas distribution members (2, 22), heating members (4, 23) and mixing members (6, 25) for the waste material mass, as well as a waste mass feed member (9, 31) and discharge opening (11, 34). According to the invention, the decomposition of the waste mass is intensified by heating the mass by means of the heating members (4, 23) connected to the gas distribution members (2, 22), by conducting gas onto the surfaces of the heating members (4, 23).

3 Claims, 3 Drawing Sheets

METHOD FOR TREATING WASTE MATERIAL

The present invention relates to a method for treating waste, particularly organic waste, and to an apparatus suited for the method, wherein the volume of the waste material is substantially reduced and the mass is rendered in a pumpable form.

Organic waste materials are biologically treated either in aerobic or anaerobic processes. As for the technical properties of the equipment, the aerobic and anaerobic methods differ from each other, although similar types of devices are sometimes used and provided with different operational equipment.

The planning and production of bioreactors form a considerable part of the expense of biological treatment. An aerobic bioreactor comprises a housing structure, and members for mixing aerating and sometimes for heating, too. A reactor used in anaerobic waste treatment comprises a housing structure, and members for mixing, heating and sometimes for the recirculation of gas.

From the DE patent publication 1,235,828 there is known a heating system for a waste mass container, which system is connected to the gas distribution means penetrating the container lid, in such a fashion that the tubular heating means extend to near the bottom of the container. The heating medium employed in the heating system is hot water, which is recirculated, via the heating pipes, back to the heat source. The hot water serving as the heating medium is not, however, in direct contact with the gas distribution means.

In the EP published specification 153,061 there is described a process container for waste sludge, wherein there are installed tubular heating elements and heat transfer elements. By means of these elements, the temperature of the waste mass is maintained suitable in order to pump the sludge from the bottom of the container towards the waste discharge opening located near the top of the container.

From the FI patent 59,384 there is known a method and apparatus for a continuous composting process for waste sludge. According to the method, the aerating of the waste material mass is carried out in the countercurrent direction, within closed conditions by means of pressure and suction fans, the initial and operational settings whereof are adjusted by means of measuring the oxygen or carbon dioxide content. Of the exhaust air from the aerating reactor. In addition to this, in the method the inlet air is heated up to the temperature range 30°-50° C., so that the temperature of the waste material mass can be maintained suitable in order to realize the method. Thus the method requires external heating means for the inlet air, wherefore the structure of the processing apparatus becomes complicated.

The SE published specification 387,622 relates to a method and apparatus for treating household waste. According to the method, in order to satisfy the oxygen need of the aerobic, heat-producing bacteria in the waste sludge, into the processing apparatus there is fed 0.2-2.0 grams of air per liter of waste sludge. The air contacts the sludge either as fine bubbles, which are fed into the apparatus distributed in the sludge, and are over a large contact surface with the surrounding air, for example by dispersing the sludge into fine drops or spread as a thin, flowing layer. According to the method, either the supplied air or the sludge must first be pretreated, in order to make the feeding of the air possible.

The object of the present invention is to eliminate some of the drawbacks of the prior art and to achieve an improved and operationally more secure method for treating waste material mass, which method uses a small amount of gas, and in which apparatus there is maintained a given temperature irrespective of the gas amount to be fed in.

The method of the present invention makes use of the combining of the gas discription and heating means of the reactors, provided for by the apparatus of the invention, so that the decompositon of the waste material is intensified by heating the mass by means of the heating system connected to the gas distribution system. With aerobic and anaerobic processes, there are generally used bioreactors with uniform housing structures and mixing means as well as heating means. The combining of the gas distribution and heating means in this type of reactor leads with an aerobic reactor to improved aerating, and with an anaerobic reactor to improved gas recirculation. Gas recirculation can be employed for mixing and/or purification of the mass. According to the invention, the gas used in the heating of the waste material mass can be recirculated gas obtained from the reactor, or aerating gas fed into the reactor.

By combining the gas distribution/recirculation members and the heating members to a uniform arrangement, considerable advantages are gained from the point of view of the process technology. In an aerobic bioreactor the heat transfer is intensified, when the air in the gas distribution member is warmed up through the wall of the gas distribution member and at the same time the blow air cleans the heat transfer surfaces. The allows heating the amount of aerating air to be reduced, substantially in which case the water formed in the decomposition of the waste material mass remains in the mass. The increase in the water content changes the properties of the waste material mass so that the density of the mass is increased, because water makes the mass more compact. Thus the homogeneity and transportability of the waste material are improved. Moreover, heating prevents for instance the condensation of water from the aerating air in the pipework, in which case the chances for pressure impacts in the aerating equipment are reduced.

In an anaerobic bioreactor, the recirculation gas cleans the heat transfer surfaces, and the condensation of the water contained in the gas is prevented owing the simultaneous warming up of the gas, and likewise the danger of pressure impacts is diminished.

In the apparatus of the invention, the gas distribution and heating members are attached to each other in a stationary fashion. A gas recirculation pipe and/or gas feed pipe is further connected to the gas distribution members. The combination of the gas distribution and heating members is advantageously located at the lower part of the reactor, essentially near to the reactor bottom.

In the apparatus of the invention, the waste material mass can be fed in either at the top or the bottom. Thus the combination of the feed devices and discharge devices is also possible, wherefore the waste treatment in the reactor of the invention becomes essentially economical. Moreover, the gas feed compressor becomes essentially economical. Moreover, the gas feed compressor can be chosen so that it is suited both for combustible and non-combustible gases.

The invention is explained below with reference to the appended drawings, where

Figure 2:
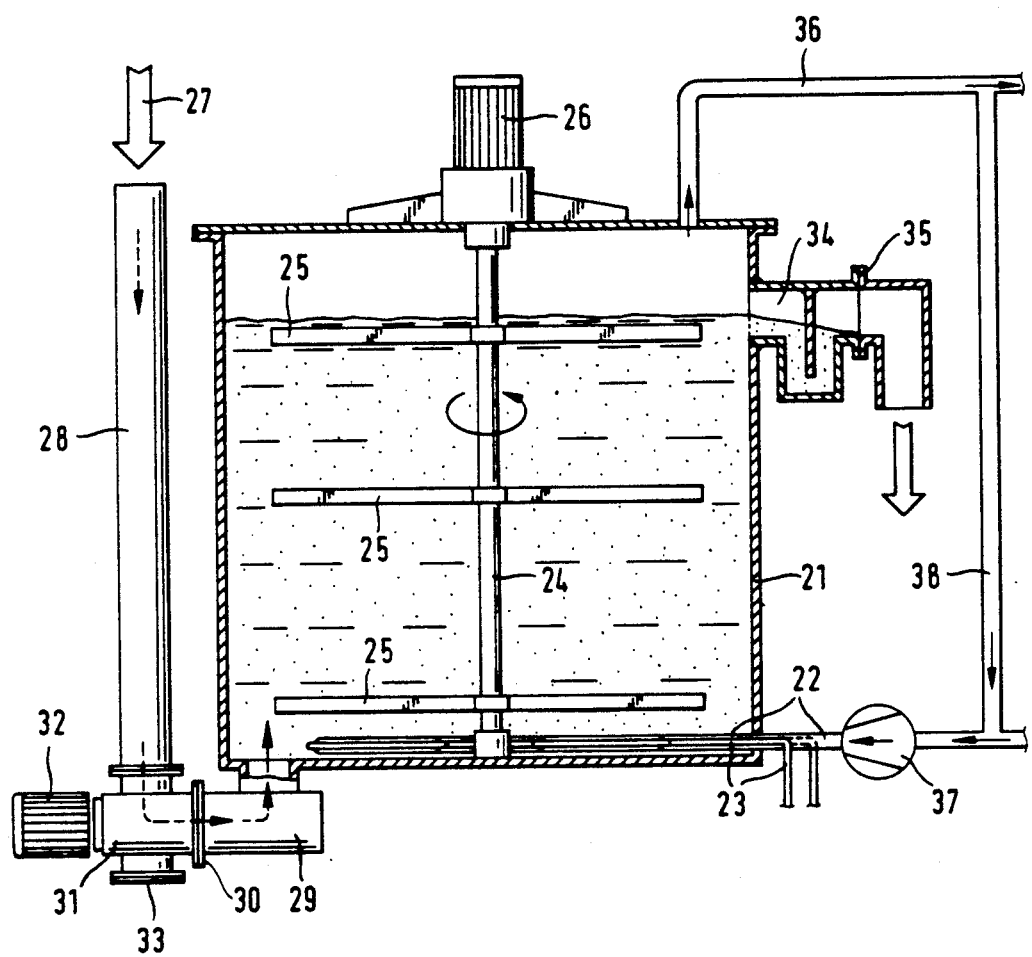
Figure 3:
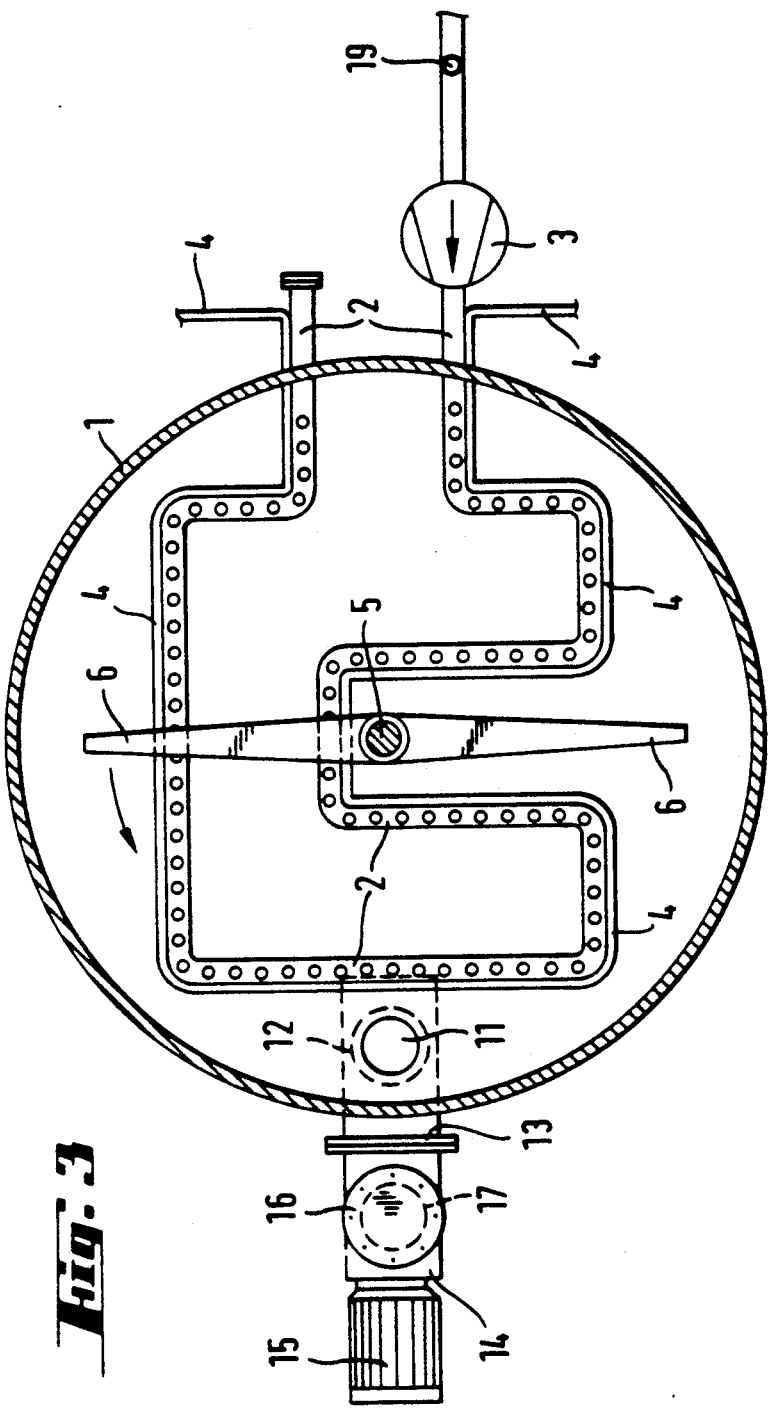

FIG. 1 illustrates a preferred embodiment of the invention in a schematical cross-section, FIG. 2 illustrates another preferred embodiment of the invention in a schematic cross-section, and FIG. 3 illustrates the preferred embodiment of FIG. 1, seen in a cross-section along the section A—A.

According to FIGS. 1 and 3, the housing (1) of the bioreactor is provided with a gas distribution member (2), whereto a compressor (3) and a heating member (4) can be connected. The gas distribution member (2) and heating member (4) are further interconnected in a stationary fashion. The mixing means, comprising a rotating shaft (5) and mixing members (6) fastened thereto, obtain their running power from a motor (7). The motor (7) can be rotated in either direction. The waste material (8) is fed to the reactor through the feed member (9) and is mixed by the rotating mixing members (6). The feed member (9) is provided with a turnable flange fastening (10). The waste material is discharged from the reactor through the discharge opening (11) onto the conveyor (12). The conveyor (12) comprises a flange (13), a turnable discharge member (14), a duplex motor (15), a blind flange (16) and a drop pipe (17). The gas is exhausted from the reactor through the exhaust pipe (18), and it can, when necessary, be recirculated by means of the recirculation pipe (19) back to the compressor (3).

According to FIG. 2, the housing (21) of the bioreactor is provided with gas distribution members (22) and heating members (23), which are attached to each other in a stationary manner. The mixing means comprising a rotating shaft (24) and mixing members (25) obtain their power from the motor (26). The waste material (27) is fed through the pipe (28) on the conveyor (29). The conveyor (29) advantageously comprises a flange (30), a turnable feed member (31), a duplex motor (32) and a blind flange (33). The waste material (27) is discharged from the reactor through the discharge member (34), which discharge member includes a turnable flange (35). Gas is exhausted from the reactor via the gas pipework (36), and it can be recirculated back to the compressor (37) by means of the recirculation pipework (38).

Although the above specification describes the preferred embodiments of the invention partly with reference to the same practical applications, the method and apparatus of the invention are not dependent on the modifications represented in the drawings, but the method and apparatus of the invention can be used with other technical appliances, too, within the scope defined in the appended patent claims.

We claim:

1. A method of treating waste material in a reactor comprising wall means defining a reaction chamber, a feed opening and a dishcharge opening, a gas distribution member within the reaction chamber, and means for mixing waste material in the reaction chamber, said method comprising:

introducing waste material into the reaction chamber by way of the feed opening to form a bed of waste material in the reaction chamber, the bed of waste material extending to a height above the gas distribution member, mixing waste material in the reaction chamber by means of the mixing means, introducing gas into the bed of waste material in the reaction chamber through the gas distribution member, discharging waste material from the reaction chamber by way of the discharge opening, and heating waste material in the reaction chamber by means of a heating member that is in direct thermally conductive contact with the gas distribution member, whereby the gas introduced into the reaction chamber also is heated.

2. A method according to claim 1, wherein the step of introducing gas into the bed of waste material comprises introducing an aerating gas into the bed of waste material.

3. A method according to claim 2, wherein the wall means define a gas outlet for discharging gas from the reaction chamber, and the method includes recirculating gas discharged from the reaction chamber to the gas distribution member.

* * * * *